Patented Oct. 15, 1929

1,731,768

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

NIPPLE

Application filed April 11, 1927. Serial No. 182,574.

My invention relates to nipples and is more particularly concerned with lubricant receiving nipples adapted to form part of a high pressure lubricating system such as that disclosed in Patents Nos. 1,307,733 and 1,307,734 to Arthur V. Gullborg. Lubricating systems of this type comprise a plurality of valved nipples, or fittings, adapted to be secured to the bearings of a machine to be lubricated, and a lubricant compressor for supplying lubricant at high pressure and provided with a discharge conduit terminating in a nozzle or coupling member which may be attached and detached from the lubricant receiving nipples in succession. The preferred form of interlocking means for attaching the coupling to the lubricant receiving nipples comprises the well known bayonet lock and it is to nipples provided with this type of coupling means that my invention relates. In manufacturing nipples of this class, it has heretofore been customary to provide each nipple with a single steel pin extending transversely through the body of the nipple and projecting from both sides thereof to interlock with a slotted part of the coupling member on the discharge conduit of the compressor. This use of a single pin has necessitated the locating of the spring for holding the inlet valve on its seat, between the pin and the valve thereby reducing the effective length of the spring to a minimum. My invention contemplates the use of a novel type of spring which need not be confined between the pin and the valve.

An object of my invention is to provide a new and improved nipple.

Another object is to provide a nipple having a valved inlet end and a coupling pin extending transversely through the body of the nipple, and a novel type of spring which is not confined between the pin and the valve.

Another object is to provide a novel spring for a nipple of the class described.

Another object is to provide a nipple which is inexpensive to manufacture and which is durable and efficient.

Further objects and advantages will appear as the description proceeds.

Figure 1:
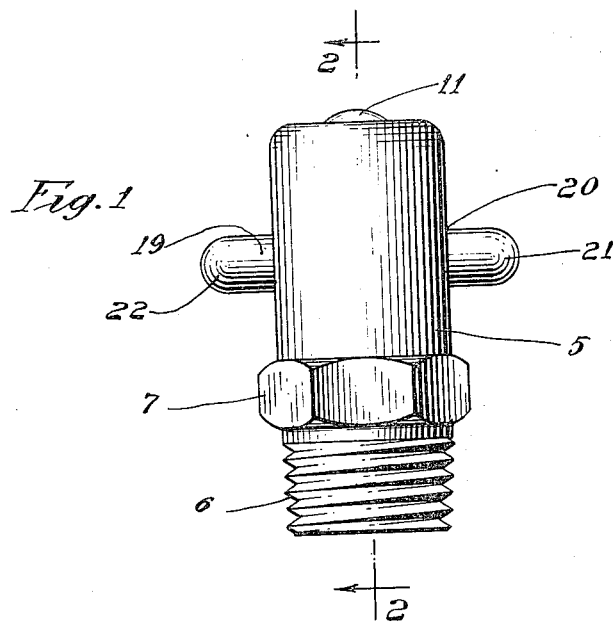
Figure 1 is a side elevation of my new and improved nipple.
Figure 2:
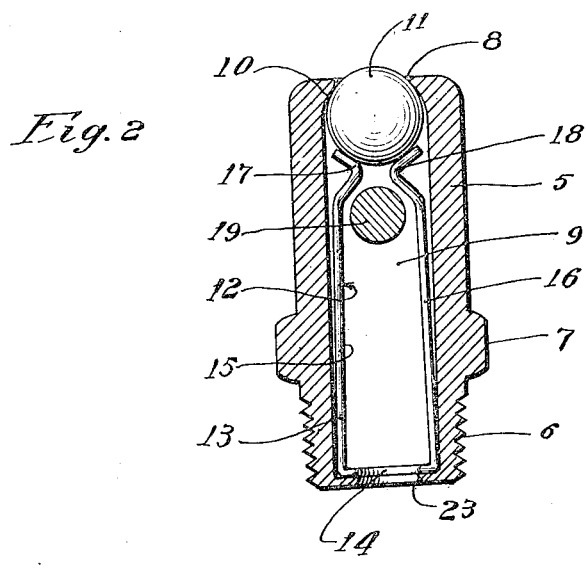
Figure 2 is a vertical section on the line 2—2 of Figure 1.

Referring to the drawing, my nipple has a body 5 preferably of brass or other comparatively soft material, and having a threaded end 6 adapted to be secured to a part to be lubricated. Adjacent the threaded part 6 is a non-circular part 7 preferably hexagonal in cross section, and adapted to cooperate with a wrench or other tool used in securing the nipple to the part to be lubricated. The body 5 is further provided with an inlet 8 leading to a bore 9 forming a passage through which lubricant may pass to the bearing to be lubricated.

Adjacent the inlet 8 is a valve seat 10 for a ball valve 11 which is normally maintained in closed position by the spring 12, which comprises a metal strap or wire 13 having a curved middle portion 14, inclined side portions 15 and 16, and V-shaped end portions 17 and 18 positioned adjacent each other with the apexes of the V's in juxtaposition and lying just under the ball valve 11. The spring 12 is so tensioned that the V-shaped ends 17 and 18 tend to move toward each other and force the ball valve 11 against its seat 10. The end of the nipple is turned in as at 23 to retain the spring in position.

My new and improved nipple is further provided with coupling means comprising a single pin 19 which is driven into a transverse bore 20 and held therein by friction. The pin 19 lies between the side portions 15 and 16 of the spring 12 and has projecting ends 21 and 22 adapted to interlock with a slotted part of a coupling member on the end of a discharge conduit (not shown). The pin 19 is usually made of steel or similar strong material in order to resist the stresses set up therein when the nipple is used with a lubricant compressor which discharges lubricant at high pressure.

Having thus illustrated and described a preferred embodiment of my invention, what I claim and desire to secure by United States Letters Patent is:

1. In a lubricating apparatus of the class described, a lubricant receiving nipple comprising a body having a passage-way therethrough and provided with means for attachment to a part to be lubricated, a longitudinally movable valve for said passageway, and laterally movable spring means for closing said valve.

2. As an article of manufacture, a lubricant receiving nipple comprising a body having a passage-way therethrough, a valve capable of movement longitudinally of said passage-way, transversely movable means for closing said valve, and coupling means extending through said first named means.

3. In apparatus of the class described, a lubricant receiving nipple comprising a body having a passage-way therethrough, a valve in said passage-way, and a spring for closing said valve, said spring including a part having two ends, both of which contact with said valve.

4. As an article of manufacture, a lubricant receiving nipple comprising a body having a passage-way therethrough, a valve in said passage-way, a spring having parts movable laterally of said passage-way responsive to movement of said valve, and coupling means extending between said parts.

5. In a lubricating apparatus of the class described, a lubricant receiving nipple comprising a body having a passage-way therethrough, a valve in said passage-way, a valve spring composed of wire having ends adjacent each other and tending to move closer together, and a coupling pin extending through said body and lying adjacent said ends.

6. In lubricating apparatus of the class described, a lubricant receiving nipple comprising a body having inlet and outlet ends, means whereby it may be attached to a part to be lubricated, and means for facilitating such attachment, a passage-way through said body, a valve seat at the inlet end of said passage-way, a valve adapted to cooperate with said valve seat, a coupling pin extending transversely through said passage-way and projecting from opposite sides of said body, and a spring comprising a member having a central portion extending transversely of said passage-way, side portions extending substantially axially of said passage-way and on opposite sides of said coupling pin, and V-shaped ends adapted to contact with said valve and urge it towards said seat.

In witness whereof, I hereunto subscribe my name this 6th day of April, 1927.

ERNEST W. DAVIS.